United States Patent [19]

Bahl et al.

[11] 3,769,453

[45] Oct. 30, 1973

[54] FINITE MEMORY ADAPTIVE PREDICTOR

[75] Inventors: Lalit R. Bahl, Yorktown Heights, N.Y.; Daniel I. Barnea, Tel Aviv, Israel; David O. Grossman, Yorktown Heights; Hisashi Kobayashi, Mohegan Lake, both of N.Y.

[73] Assignee: International Business Machines Coporation, Armonk, N.Y.

[22] Filed: Aug. 17, 1972

[21] Appl. No.: 281,359

[52] U.S. Cl. ........... 178/6, 178/DIG. 3, 179/15 BW
[51] Int. Cl. ........................................... H04n 7/12
[58] Field of Search ..................... 178/5, 6, 6.8, 7.1, 178/DIG. 3; 325/38, 38 B; 179/15 BW

[56] References Cited

UNITED STATES PATENTS 3,736,373 5/1973 Pease ........................... 178/DIG. 3

*Primary Examiner*—Howard W. Britton
*Attorney*—V. Siber et al.

[57] ABSTRACT

A system for compacting digital data by means of prediction error coding. Prediction for each unknown bit is a function of previous detected levels in the data stream. A plurality of *n*-bit up-down counters, each associated with one of the possible states of prediction for an unknown bit, is utilized to arrive at a prediction of the level of the unknown bit. If the value found in the up-down counter is above a pre-specified level, a prediction will be made that the unknown bit is a one, otherwise, the prediction is zero.

The predictor code output signals are summed modulo 2 with the actual signal value of the predicted bit in order to develop a prediction error pattern having a sparsity of ones. This error pattern is adaptable to run-length coding. After each prediction, the appropriate up-down counter is incremented or decremented depending on the actual value of the data bit that has been predicted so as to make future predictions adaptive to the previously coded data stream. The number of stages *n* is small so that the counters which control the predictions quickly adapt to changes in the nature of the actual information stream.

6 Claims, 6 Drawing Figures

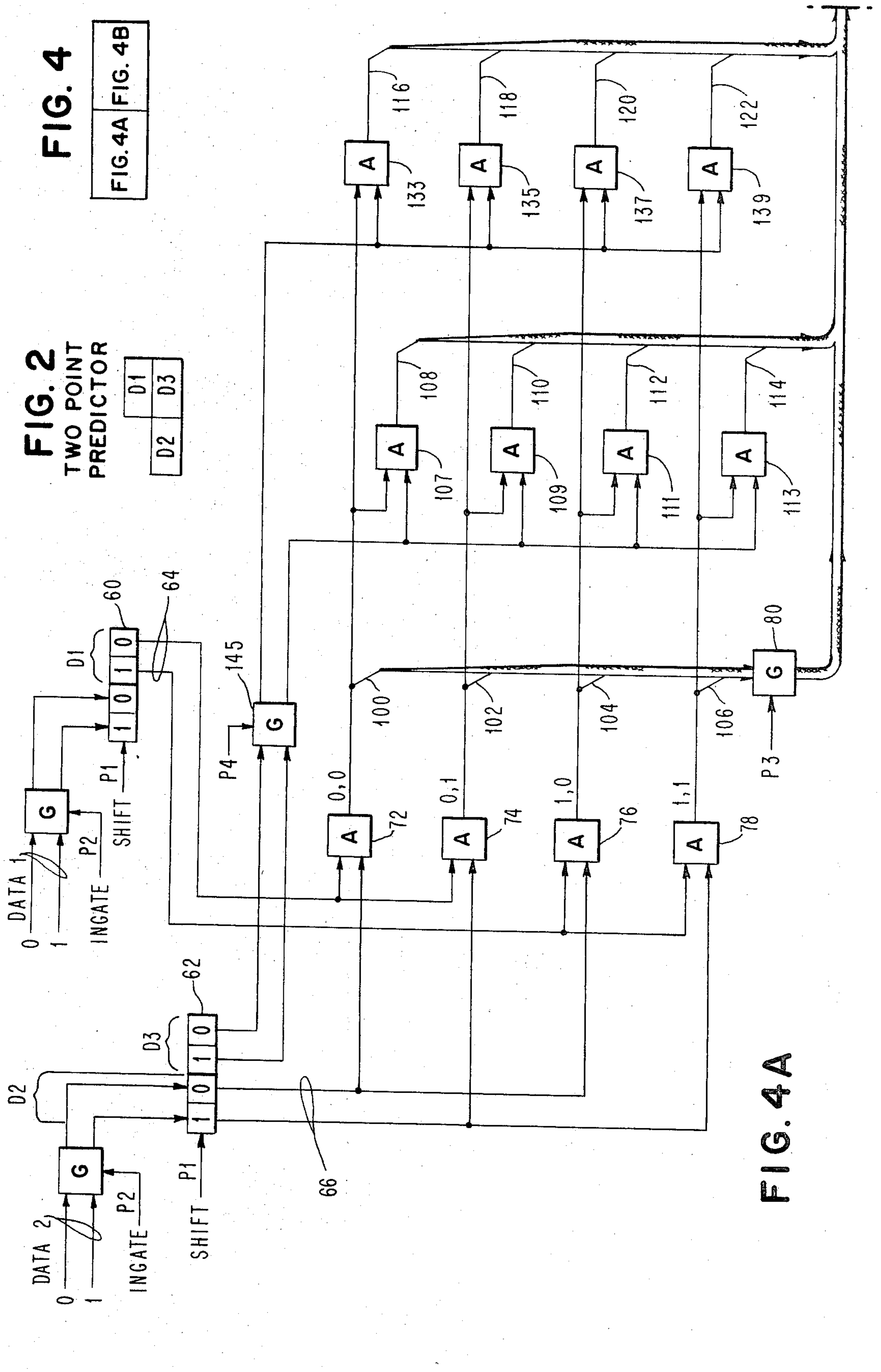
FIG. 4, FIG. 2 TWO POINT PREDICTOR, FIG. 4A

FINITE MEMORY ADAPTIVE PREDICTOR

BACKGROUND OF THE INVENTION

This invention relates to the processing of digital information in order to facilitate data compaction. More particularly, it relates to an adaptive prediction scheme that develops a prediction error data pattern that is well suited for compaction.

In the transmission of digital data, it is very desirable to reduce the amount of physical data that is necessary to be transmitted. One way of achieving compression of data is by developing a prediction error pattern having very few binary "1's" in the data stream and then coding this error pattern by a coding method such as run-length encoding. A run-length code generally provides a high degree of compaction for data having long strings of either "1's" or "0's" The application of predictive coding to a data stream was first described in "Predictive Coding" by P. Elias, IRE Transactions on Information Theory, IT—1, March 1955. Predictive coding is extremely useful in those situations where data that is to be transmitted has a high degree of redundancy. For example, it is known that picture information has a high degree of correlation between picture elements.

Whenever redundant digital data is found in a message stream, it is generally possible to predict the value of any particular bit position based on previous information in the message stream. That is, by looking at surrounding data bits a prediction may be made as to the value of the particular bit under examination. After having made a prediction based on some predetermined rule, the predicted information bit is subtracted modulo 2 from the actual information bit. This subtraction results in an output signal stream having a large number of "0's" due to the fact that with the presence of redundancy, the prediction rule generally predicts the right value. Whenever the prediction is in error, the subtraction will result in a "1" bit of information. The output data stream of "0's" with occasional "1's" that represent prediction errors is generally referred to as a prediction error pattern.

The concept of applying predictive coding to printed documents is known in the prior art and has been presented in "Entropy of Printed Matter" by R. B. Arps, Report 31, Stanford Electronics Laboratory, 1969. A further example of the application of predictive coding in a system for compressing image information, is presented in "Data Compression by Predictive Coding with a Rejection Option" by L. R. Bahl et al., IBM Technical Disclosure Bulletin, Vol. 14, No. 2, July 1971.

Since the prediction error pattern generally consists of long strings of "0's" interspersed by "1's," a run-length code may be used to achieve a high degree of compaction of the prediction error pattern. Examples of run-length encoders may be found in U.S. Pat. No. 2,963,551 issued Dec. 6, 1960 to W. F. Schreiber et al.; U.S. Pat. No. 3,061,672 issued Oct. 30, 1962 to H. Wyle; U.S. Pat. No. 3,483,317 issued Dec. 9, 1969 to P. H. DeGroat.

In the transmission of picture information in a binary data format, it has been found that any selected prediction rule has a varying efficiency with regard to the type of information which is represented. For example, some prediction rules yield good results on character information and poor results with graphic information or vice versa. One approach presented in the prior art to correct this problem is disclosed in U.S. Pat. No. 2,905,756 issued Sept. 22, 1959 to R. E. Graham. In that patent, a plurality of predictors are available for selection during the coding of a data message. A determination is made as to which prediction mode is best suited for a minimum-error prediction of a sample, and then the appropriate prediction mode is entered into. While this approach presents some form of adaptation to the particular type of information which is being coded, there is the requirement for additional prediction circuitry thus increasing the cost of the apparatus for coding the information.

OBJECTS OF THE INVENTION

Therefore, it is an object of the present invention to provide a predictive coding process that automatically adapts a prediction rule best suited to the information being coded.

It is another object of the present invention to provide a low cost adaptive predictive coding device having a plurality of prediction rules for each of the possible states of information that quickly adapt themselves based upon a history of previous information conditions.

It is a further object of the invention to provide an adaptive predictive coding device wherein states of prediction are associated with a finite adaptive storage means that controls the prediction of image points of a digitized document.

SUMMARY OF THE INVENTION

In the present invention, an adaptive predictive coding process and device are provided. Given a data stream of binary digits which represent some form of redundant information, the adaptive predictive coding device will automatically develop a prediction rule that is well suited for the particular data that is to be coded. The prediction of an unknown information bit is based on an $m$-point predictor which in the disclosed embodiment operates with $m = 2$. Assuming document information which has been digitized, for each unknown image element of the document, the image points directly above and adjoining the elements to be predicted are examined.

For a two-point predictor, there are four different possible states on which to base a prediction. For each one of these states, there is associated therewith an $n$-bit up-down counter which determines the prediction of any selected information bit element. In order to form a prediction, the state of the two adjoining bits is decoded, then a particular state is selected and the appropriate up-down counter is examined at the high order bit position (the most significant bit). If the high order bit position is a "1," then a prediction is made that the information bit to be predicted is a "1." If the high order bit position is "0," then accordingly the prediction is also "0." After prediction is accomplished, the selected counter is either incremented or decremented depending on the actual value of the information bit which has been predicted. The speed with which the prediction rules change with respect to changes in the data pattern is a function of $n$, the number of stages in the counters. For quick adaptation, $n$ is selected to be small.

BRIEF DESCRIPTION OF THE DRAWINGS

FIG. 2 is a diagrammatic representation of a two-point predictor pattern.

FIGS. 4A and 4B represent a circuit diagram of the finite memory adaptive predictor.

DETAILED DESCRIPTION OF THE INVENTION

The finite memory adaptive predictor disclosed herein provides a coding device for developing a prediction error pattern that adapts itself to changes in the information which is being coded. That is, assuming an information stream having a certain degree of redundancy, i.e., digitized document information, TV signals, etc., the adaptive predictor will continuously change the prediction rules so that the predictor tends to make a prediction for each examined point based on a recent history of prior information.

Figure 1:
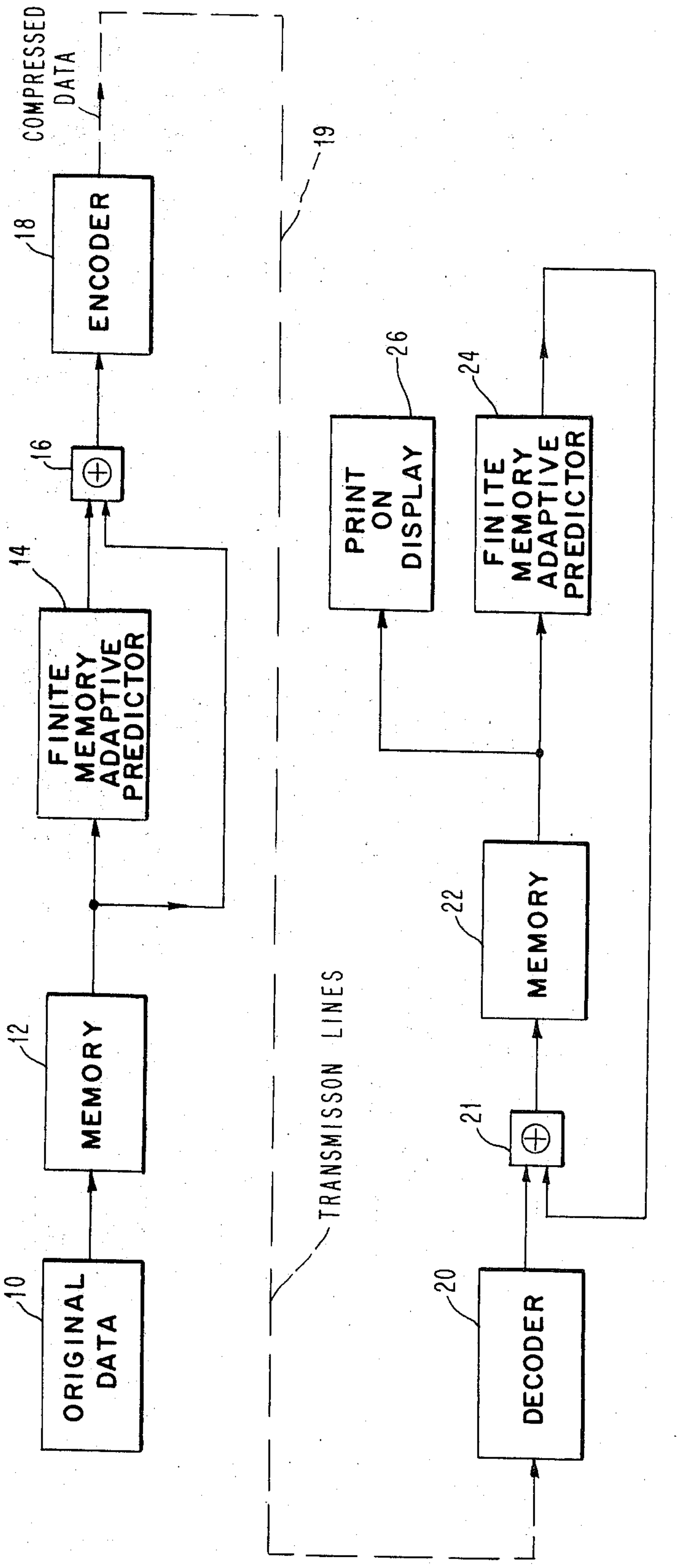
FIG. 1 is a block diagram representation of a predictive coding system that utilizes the finite memory adaptive predictor of FIGS. 4A and 4B.

For the purpose of illustrating the invention, the adaptive predictor is described herein in terms of developing a prediction error pattern for binary information representative of a document containing textual or graphic information. These types of document information may be transmitted by devices known as facsimile copiers. One such device is shown in U.S. Pat. No. 3,344,231. The scanning mechanism of a facsimile system generates a series of binary "1's" and "0's" which represent the presence of a black or white image point, respectively. That is, for each image point on the document, a binary bit will be generated. This binary data is represented in FIG. 1 as being available in the original data block 10. This original data 10 may be coming from the facsimile scanning system itself or from some off-line storage means (not shown) such as a magnetic disk or tape.

The two-point predictor scheme utilized in the present invention associates an up-down counter with each of the four possible states that two adjoining bit positions have relative to an unknown or examined point. That is, by examining the point directly above and directly adjacent to the examined unknown point, a prediction can be made as to whether the unknown point D3 is black or white ("1" or "0") depending on the current value of the associated counter, i.e., whether the most significant bit is "1" or "0." While in the particular embodiment disclosed herein, a two-point predictor is utilized, it should be recognized by those skilled in the art that this predictor pattern is merely illustrative and the principles of the invention are equally applicable to an $m$-point predictor, where $m$ may be any number. If, for example, a four-point predictor, $m = 4$, were used, then there would be 16 possible states and the number of up-down counters would be increased from four to 16. In order to simplify the description of the invention and more clearly point out the inventive features, the disclosed embodiment is presented in terms of the two-point, $m = 2$, predictor.

Again referring to FIG. 1, the original data 10 is loaded into a memory 12 which may be of conventional design and capable of holding the "1" and "0" pattern representative of the document which has been scanned and made available in original data 10. The binary data in memory 12 is presented to the predictor 14 which predicts the value of the unknown point D3. The predicted binary value of D3 is then compared with the actual binary value of D3 by means of exclusive-OR 16 in order to develop an error pattern consisting mostly of "0's" and an occasional "1" that presents an error in prediction performed by the predictor 14. This error pattern consisting of long strings of "0's" interspersed by "1's" is then encoded by encoder 18, which is, for instance, a conventional run-length coding device. The resulting output of encoder 18 is a compressed data stream which is then transmitted by means of an appropriate channel 20 to a receiver device capable of decoding and reconstructing the original data in accordance with the identical prediction rule used by predictor 14.

The compressed data is received at a receiving station and decoder 20 reconstructs the prediction error pattern which was coded by the encoder 18. This prediction error pattern is combined with the predictor 24 output by exclusive-OR 21. The output of exclusive-OR is then loaded into memory 22 which feeds predictor 24. The predictor 24 operates on a prediction rule that is identical to that used by predictor 14. By using the same prediction rule, the predictor 24 is capable of reconstructing the original data and making it available to memory 22 and/or print or display means 26.

Figure 3:
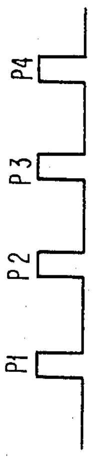
FIG. 3 is a timing pulse diagram for controlling the predictor shown in FIGS. 4A and 4B.
Figure 4B:
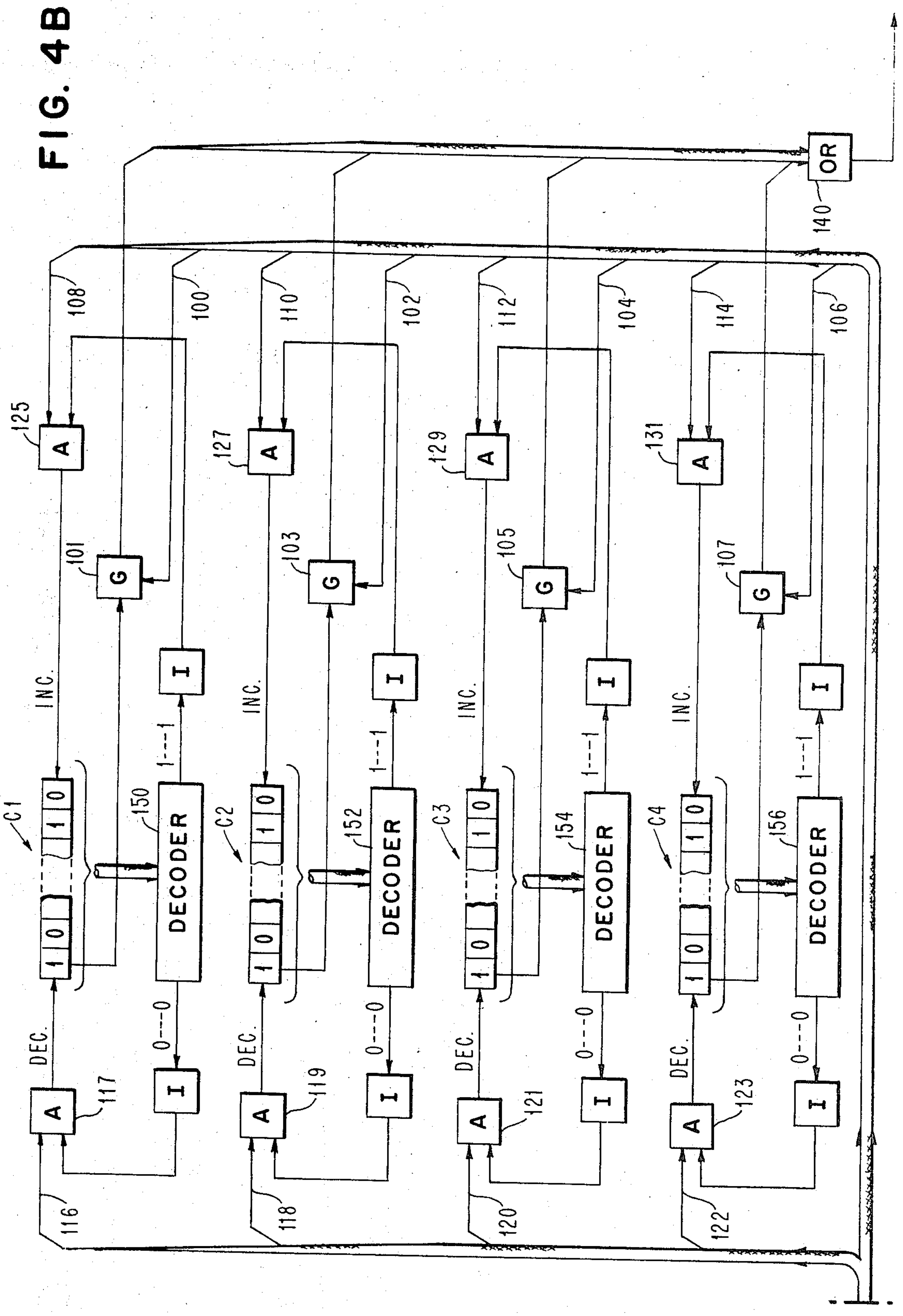

Referring now to FIG. 4, there is shown a circuit diagram of the finite memory adaptive predictor 14 and also 24 of FIG. 1. This adaptive predictor 14 is controlled by the timing pulses P1, P2, P3 and P4 as shown in FIG. 3. It is assumed that all binary data to be coded are available in memory 12 as indicated above. The data identified as data 1 and data 2 represent binary information on succeeding image lines. That is, the data 1 leads are associated with scan line $j$ in a document that has been scanned and converted to binary information, and the data 2 leads are associated with the $j+1$ scan line of the same document where $j - 1, 2 \ldots k-1$, where $k$ is the last line in the document.

For the purpose of illustration, it is assumed that the predictor of FIG. 4 has been initialized by resetting all counters, latches, and associated circuitry. It should be recognized by those skilled in the art, that the appropriate reset and initialization lines are well within the skill of the art and need no further explanation at this point. The P1 pulse, shifts data information into shift registers 60 and 62 one bit at a time, shifting to the right. Thus, the P1 clock pulse shifts and D1 and D3 information bits into shift registers 60 and 62, respectively. Then, the P2 clock signal gates the next data bits of the lines $j$ and $j+1$ into the appropriate left-most register position of registers 60 and 62. It should be recognized that lines $j$ and $j+1$ could be scanned simultaneously thus eliminating the need of having memory 12. The resulting data in shift registers 60 and 62 are then in a form as shown in FIG. 2 and ready to be utilized in predicting the values of data bit D3 during the P3 clock time. Leads 64 and 66 present the binary condition of the D1 and D2 bits to a plurality of AND gates 72, 74, 76, and 78. These AND gates 72 through 78 decode one of the four possible states that the D1–D2 bit combination can have and present a "1" signal level at the output of the selected AND gate. That is, the "0,0" condition presents a pulse on line 100, the "0,1" condition presents a pulse on line 102, the "1,0" condition presents a pulse on 104 and if a "1,1" condition exists, a pulse is presented along line 106. The state of the D1–D2 set is gated by means of gate 80 at clock P3 time to operate one of the gates 101, 103, 105, 107 in order to gate the high order bit of one of the counters C1, C2, C3, C4, whichever corresponds to the D1–D2 set, to output OR gate 140. For example, if the "0,0" state was detected, the highest bit of counter C1 would be gated through gate 101 to output OR gate 140. The value of the high order bit in counter C1 represents the prediction of either a "1" or "0" state of bit D3. It should be noted here that the up-down counters C1, C2, C3 and C4 should be of a relatively small finite size in order for the prediction value in the highest order bit to quickly adapt to changes in the document information. The number of stages contained in the counters affects the number of information bits that must be examined prior to a switch in prediction rule. An appropriate size of counter has been found to be a four-stage counter capable of counting from 0–15.

In accordance with the prediction scheme presented herein, a "1" state indicates that the probability of black *p*(black) is higher than *p*(white) based on updated document information. Therefore, whenever the selected up-down counter that corresponds to the particular D1–D2 state decoded has reached a quantity of at least half its maximum count, then *p*(black) is chosen for that state. This condition is easily detected by examining the highest bit position of the counter. Since when the highest bit position is a "1," it is known that the counter has passed its mid-point and accordingly *p*(black) > *p*(white). It should be noted that the counters C1 through C4 may be replaced by equivalent counters capable of counting positive and negative numbers and then the conditional probability of black or white would depend on the sign of the counters.

Counters C1, C2, C3 and C4 are each capable of being incremented or decremented along the INC or DEC leads shown in FIG. 4. As discussed previously, the counters C1 through C4 are truncated and do not wrap around when their maximum or minimum values are reached. In order to inhibit the wrap around of the counters, the decoders 150, 152, 154, and 156 are provided. When decoders 150 and 156 decode an all "0" state in their respective counters, they inhibit the counters by presenting a "0" state to the appropriate one of AND gates 117, 119, 121, and 123. Also, if an all "1" pattern is detected in the respective counter, the INC lead is degated by presenting a "0" at the appropriate one of AND gates 125, 127, 129, and 131, which gates are connected to lines 108, 110, 112, and 114, respectively.

Assuming that the counters C1 through C4 do not contain all "0's" or all "1's," then in accordance with the decoding of the D1–D2 set, the appropriate leads from 100 through 106 corresponding to the decoded state will have a "1" pulse which is presented to one of the AND gates 107, 109, 111, 113 and simultaneously to one of AND gates 133, 135, 137 and 139. Then at P4 clock time AND gate 145 is opened to gate the actual binary value of D3 to either the INC or DEC lead depending on whether D3 is "1" or "0." If the D3 position of register 62 happens to be a "1" which indicates a black image point, then at P4 clock time a "1" will appear on the INC lead, and a "0" will appear on the DEC lead of the selected counter. If the D3 position of register 62 happens to be a "0" which indicates a white image point, then at P4 clock time a "0" will appear on the INC lead, and a "1" will appear on the DEC lead of the selected counter. The updated count in the counter associated with the state of the D1–D2 set will effectively change the *p*(black) in bit position D3 depending on the actual bit value found in D3 for that D1–D2 set.

At the completion of the P4 clock time, the process continues by shifting the next bit of information on lines *j* and *j*+1 into the registers 60 and 62. In a similar manner, all information is processed until the last image points or bits in the lines *j* and *j*+1 have been examined. At that point, the data 1 and data 2 leads are made available to examine the *j*+1 information line on data 1 and the *j*+2 information line on the data 2 leads. This sequence continues until all lines of information representing the examined document have been examined. As indicated previously, the same finite memory adaptive predictor described with reference to FIG. 4 is utilized at the transmitter and receiver stations.

EXTENSIONS OF THE INVENTION

The exemplary embodiment disclosed herein describes the invention in terms of a binary message. It should be recognized that the prediction scheme is equally applicable to an *l* level signal message, where *l* levels may be represented by the integers modulo-*l*. Accordingly, all circuit elements other than the up-down counters would be substituted by *l*-level logic devices or their binary implementation. Also, the prediction error pattern would be subtracted modulo-*l* at the transmitter and added modulo-*l* at the receiver stations.

While the invention has been described in terms of its application of predicting image points in a digitized document, it should be apparent to those skilled in the art that the inventive principles are also applicable to other digital data having redundancy. Furthermore, while the finite storage means disclosed herein are similar up-down, non-wrap around counters, it should be recognized that the invention is not limited to such. For example, each of the counters C1, C2, C3, and C4 could be substituted by a shift register and majority logic associated with each register to establish a prediction. The use of shift registers would eliminate any bias of the store means due to long strings of "1's" or "0's."

Further changes may be made to the counter without departing from the spirit and scope of this invention. For example, the counters C1, C2, C3, and C4 may be of different size and the prediction of each state may be made dependent on other than the mid-point value of the counter. A further modification which may be made is that the counters may be incremented or decremented in accordance with a prespecified function, rather than equal linear increments.

What is claimed is:

1. A device for predicting the signal level value of a message element of information in a modulo-*l* message stream having some degree of redundancy comprising:

means for examining the signal level value of adjoining message elements;

decode means for determining one of the possible states that the combination of adjoining message elements exhibit and providing an output signal indicating that particular state;

a plurality of storage devices, each associated with one of the possible states of the combination of adjoining message elements;

means responsive to the output of said decode means for selecting which of said plurality of storage devices is to be examined;

means for examining the contents contained in said selected storage devices, and predicting the value of said message element;

means for examining the actual signal level value of said message element and changing the contents in said storage device in accordance with the message element signal level value.

2. A system as defined in claim 1 wherein $l = 2$ and each element of said message is a binary bit of information.

3. A system as defined in claim 2 wherein said storage devices comprise:

a plurality of binary truncated up-down counters;

whereby said plurality of counters are incremented or decremented after each prediction, an increment being performed when the actual binary value of said message bit is a "1," and a decrement of said counters being performed when the actual value of said message bit is a "0."

4. The system as defined in claim 2 wherein said storage devices comprise:

a plurality of truncated digital counters;

whereby said plurality of counters is incremented or decremented in accordance with the actual value of said message bit.

5. A device as defined in claim 2 wherein said binary information is representative of a document page that has been digitized into a plurality of lines consisting of "1's" and "0's" that corresponds to the presence of a black or white image point being present on the document face wherein said means for examining associated information bits comprises:

means for examining information bits in the local area of the message image point to be predicted;

wherein said plurality of truncated counters are associated with one of the possible $2^n$ cases of local image point sets corresponding to the number of associated points examined in the local area of the predicted image point, where $n$ equals the number of local image points examined.

6. A process for predicting the signal level value of a message element of information in a modulo-$l$ stream having some degree of redundancy, said process comprising the steps of:

examining the signal value of adjoining message elements;

determining one of the possible states that the combination of adjoining message elements exhibit;

assigning a plurality of storage areas, each associated with one of the possible states of the combination of adjoining message elements;

selecting one of said storage areas in accordance with the determined state of said adjoining elements;

examining the contents contained in the selected storage area, and predicting the value of said element in accordance with said contents;

examining the actual signal level value of said message element and changing the contents in said storage area in accordance with the message element signal level value.

* * * * *